United States Patent
Ishido et al.

(10) Patent No.: US 10,048,414 B2
(45) Date of Patent: Aug. 14, 2018

(54) OPTICAL DEVICE, OPTICAL SYSTEM, AND IMAGING APPARATUS

(71) Applicant: ASAHI GLASS COMPANY, LIMITED, Tokyo (JP)

(72) Inventors: So Ishido, Koriyama (JP); Hiromichi Nagayama, Koriyama (JP); Kenichi Shioya, Koriyama (JP); Hiroki Hotaka, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 510 days.

(21) Appl. No.: 14/796,469

(22) Filed: Jul. 10, 2015

(65) Prior Publication Data

US 2015/0309224 A1    Oct. 29, 2015

Related U.S. Application Data

(63) Continuation of application No. PCT/JP2014/051012, filed on Jan. 20, 2014.

(30) Foreign Application Priority Data

Jan. 22, 2013    (JP) .................................. 2013-009512

(51) Int. Cl.
    *G02B 5/20*    (2006.01)
    *G02B 5/22*    (2006.01)
    (Continued)

(52) U.S. Cl.
    CPC ............ *G02B 5/208* (2013.01); *G02B 5/22* (2013.01); *G03B 11/00* (2013.01); *H04N 5/72* (2013.01)

(58) Field of Classification Search
    CPC .. G02B 27/001; G02B 27/0988; G02B 27/09; G02B 27/0938; G02B 5/005; G02B 5/20; G02B 5/205; G02B 5/208; G02B 5/22
    (Continued)

(56) References Cited

U.S. PATENT DOCUMENTS 7,405,890 B2 *    7/2008    Nakamura ............. G02B 13/06
                                                  359/753
8,014,071 B2 *    9/2011    Matsumoto ............ G02B 5/208
                                                  359/582

(Continued)

FOREIGN PATENT DOCUMENTS

JP    52-76944 A    6/1977
JP    2003-213230 A    7/2003

(Continued)

OTHER PUBLICATIONS

Tao et.al. "Synthesis and characterization of highly optical transparent and low dielectric constant fluorinated polymides", 2009, vol. 50, pp. 6009-6018.*

(Continued)

*Primary Examiner* — Robert E Tallman
(74) *Attorney, Agent, or Firm* — Oblon, McClelland, Maier & Neustadt, L.L.P.

(57) ABSTRACT

An optical device has a visible light transmittance that decreases from a central part thereof towards a peripheral part thereof. The optical device includes a visible light absorbing part, made of a material that absorbs at least a part of visible light, and having a thickness that increases from a central part thereof towards a peripheral part thereof, and a visible light transmitting part, made of a material that transmits the visible light, and is stacked on the visible light absorbing part. A relationship T420/T360>=3 is satisfied, where T420 denotes a transmittance of light having a (Continued)

wavelength of 420 nm, and T360 denotes a transmittance of light having a wavelength of 360 nm.

20 Claims, 9 Drawing Sheets

(51) Int. Cl.
    *G03B 11/00*     (2006.01)
    *H04N 5/72*     (2006.01)

(58) Field of Classification Search
    USPC ....... 359/350, 355, 359, 361, 613–614, 641,
                 359/642, 722–724, 738–740, 885, 888,
                 359/894
    See application file for complete search history.

(56) References Cited

U.S. PATENT DOCUMENTS

| | | | |
|---|---|---|---|
| 8,953,249 B2 * | 2/2015 | Inomoto | G02B 3/00 359/642 |
| 2003/0016452 A1 | 1/2003 | Sayag | |
| 2004/0263994 A1 * | 12/2004 | Sayag | G02B 7/027 359/664 |
| 2005/0041949 A1 | 2/2005 | Onuki et al. | |
| 2007/0139792 A1 * | 6/2007 | Sayag | G02B 5/005 359/739 |
| 2010/0227161 A1 | 9/2010 | Shibuya et al. | |
| 2013/0329303 A1 | 12/2013 | Inomoto et al. | |

FOREIGN PATENT DOCUMENTS

| | | |
|---|---|---|
| JP | 2004-536341 | 12/2004 |
| JP | 2005-266096 | 9/2005 |
| JP | 2006-301221 | 11/2006 |
| JP | 2007-219210 | 8/2007 |
| JP | 2009-521722 | 6/2009 |
| JP | 2010-201789 A | 9/2010 |
| JP | 2010-249928 A | 11/2010 |
| JP | 2011-227488 | 11/2011 |
| JP | 2013-254154 | 12/2013 |

OTHER PUBLICATIONS

International Search Report dated Apr. 28, 2014, in PCT/JP2014/051012 filed Jan. 20, 2014.

* cited by examiner

OPTICAL DEVICE, OPTICAL SYSTEM, AND IMAGING APPARATUS

CROSS-REFERENCE TO RELATED APPLICATIONS

This application is a continuation application filed under 35 U.S.C. 111(a) claiming the benefit under 35 U.S.C. 120 and 365(c) of PCT International Application No. PCT/JP2014/051012 filed on Jan. 20, 2014, which is based upon and claims the benefit of priority of Japanese Patent Application No. 2013-009512 filed on Jan. 22, 2013, the entire contents of which are incorporated herein by reference.

BACKGROUND OF THE INVENTION

1. Field of the Invention

The present invention relates to an optical device, an optical system, and an imaging apparatus.

2. Description of the Related Art

In an optical apparatus, such as a camera or the like, an optical diaphragm (or stop), an ND (Neutral Density) filter, or the like is used to adjust an amount of light incident to a lens or the like. The camera is implemented in a mobile phone, a portable terminal, or the like, and a compact optical diaphragm is also used in such a camera, as proposed in Japanese Laid-Open Patent Publication No. 2006-301221, for example.

FIGS. 1A and 1B are diagrams for explaining an example of the diaphragm. A diaphragm 910 includes an aperture 911 at a central part of a plate made of a light blocking material. Light at a peripheral part of the plate is blocked, and the light passes through the central part where the aperture 911 is formed. FIG. 1A is a top view of the diaphragm 910, and FIG. 1B illustrates a light transmittance along a one-dot chain line 1A-1B in FIG. 1A.

On the other hand, in the optical diaphragm 910, diffraction of light generated in a periphery of the aperture 911 is becoming no longer negligible, and it is becoming more difficult to improve the resolution. In other words, as a number of pixels of the camera increases, there are demands for a compact optical diaphragm that does not deteriorate the resolution.

As an example of an optical device having the optical diaphragm that satisfies such demands, there is a known apodized filter having a configuration in which the transmittance of visible light is high at the central part, and the transmittance decreases from the central part towards the peripheral part, as illustrated in FIGS. 2A and 2B. FIGS. 2A and 2B are diagrams for explaining an example of the apodized filter. FIG. 2A is a top view of an apodized filter 920 having an aperture 921 at the central part thereof, and FIG. 2B illustrates the light transmittance along a one-dot chain line 2A-2B in FIG. 2A.

Related art further includes a hard coat film proposed in Japanese Laid-Open Patent Publication No. 2011-227488, for example.

In the diaphragm 910 described above, the aperture 911 is air, and there is no deterioration caused by ultraviolet (UV) light. On the other hand, in the apodized filter 920 described above, a material through which visible light is transmitted exists at the aperture 921, and this material may be exposed to the ultraviolet light. When the material at the aperture 921 is exposed to the ultraviolet light, yellowing or cracks may be generated at the aperture 921, to thereby reduce the visual light transmittance of the aperture 921. In other words, an apodized filter having a resistance to the ultraviolet light at the aperture 921 is also desired.

SUMMARY OF THE INVENTION

Accordingly, it is an object in one aspect of the embodiments to provide an optical device in which a light transmittance decreases from a central part thereof towards a peripheral part thereof, and ultraviolet light is blocked at each of the central part, an intermediate part, and an end part of the optical device.

According to one aspect of the embodiments, an optical device has a visible light transmittance that decreases from a central part thereof towards a peripheral part thereof, and includes a visible light absorbing part that absorbs at least a part of visible light, and has a thickness that increases from a central part thereof towards a peripheral part thereof; and a visible light transmitting part that transmits the visible light, and is stacked on the visible light absorbing part, wherein a relationship T420/T360>=3 is satisfied in a region in which Tave>=50%, where T420 denotes a transmittance of light having a wavelength of 420 nm, T360 denotes a transmittance of light having a wavelength of 360 nm, and Tave denotes an average transmittance of light having a wavelength in a range of 400 nm to 700 nm.

According to another aspect of the embodiments, an optical device has a visible light transmittance that decreases from a central part thereof towards a peripheral part thereof, and includes a visible light absorbing part that absorbs at least a part of visible light, and has a thickness that increases from a central part thereof towards a peripheral part thereof; and a visible light transmitting part that transmits the visible light, and is stacked on the visible light absorbing part, wherein a relationship T420/T360>=3 is satisfied in a region in which a visible light transmittance is highest, where T420 denotes a transmittance of light having a wavelength of 420 nm, and T360 denotes a transmittance of light having a wavelength of 360 nm.

According to still another aspect of the embodiments, an optical device has a light transmittance that decreases from a central part thereof towards a peripheral part thereof, and includes a visible light absorbing part that absorbs at least a part of visible light, and has a thickness that increases from a central part thereof towards a peripheral part thereof; and a visible light transmitting part that transmits the visible light, and is stacked on the visible light absorbing part, wherein a transmittance of light having a wavelength in a range of 300 nm to 360 nm is 10% or lower.

DESCRIPTION OF THE PREFERRED EMBODIMENTS

Figure 1A:
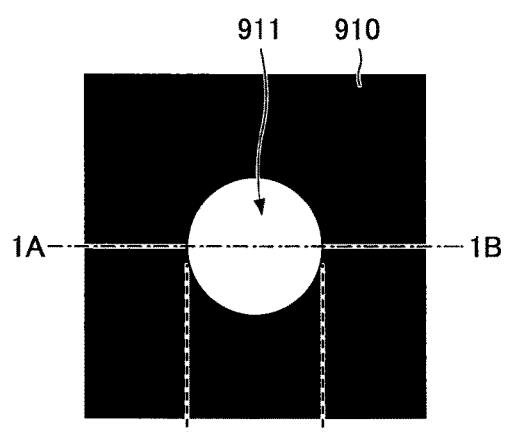
FIGS. 1A and 1B are diagrams for explaining an example of a diaphragm.
Figure 1B:
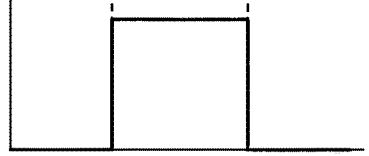
Figure 2A:
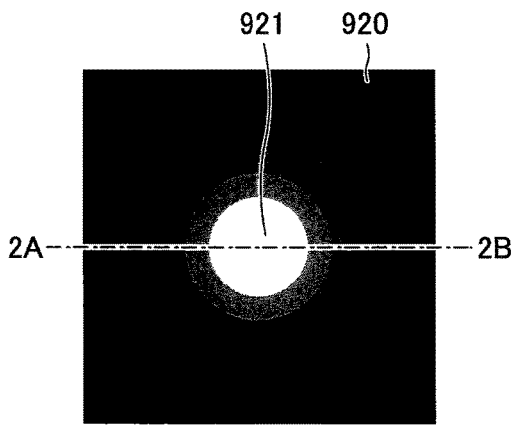
FIGS. 2A and 2B are diagrams for explaining an example of an apodized filter.
Figure 2B:
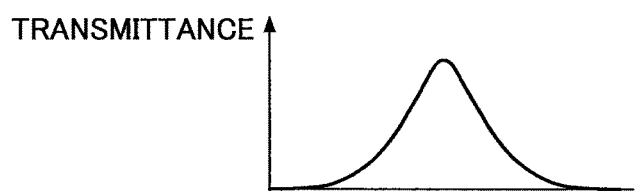

A description will hereinafter be given of embodiments of the present invention with reference to the drawings. In the following description, those parts that are the same are designated by the same reference numerals, and a repeated description of the same parts will be omitted.

In this specification, light having a wavelength in a range of 300 nm to 380 nm will be referred to as ultraviolet light, and light having a wavelength in a range of 400 nm to 700 nm will be referred to as visible light.

Figure 3:
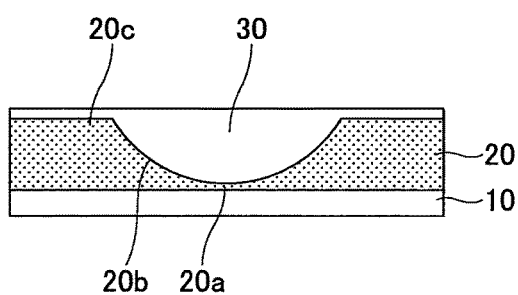
FIG. 3 is a diagram illustrating an example of a configuration of an optical device in a first embodiment.

A description will be given of an optical device in a first embodiment, by referring to FIG. 3. FIG. 3 is a diagram illustrating an example of a configuration of the optical device in the first embodiment. The optical device in this embodiment is the so-called apodized filter including a transparent substrate 10 that transmits the visible light, a visible light absorbing part 20 that is formed on the transparent substrate 10 and is made of a material that absorbs the visible light, and a visible light transmitting part 30 that is made of a material that transmits the visible light.

Figure 4:
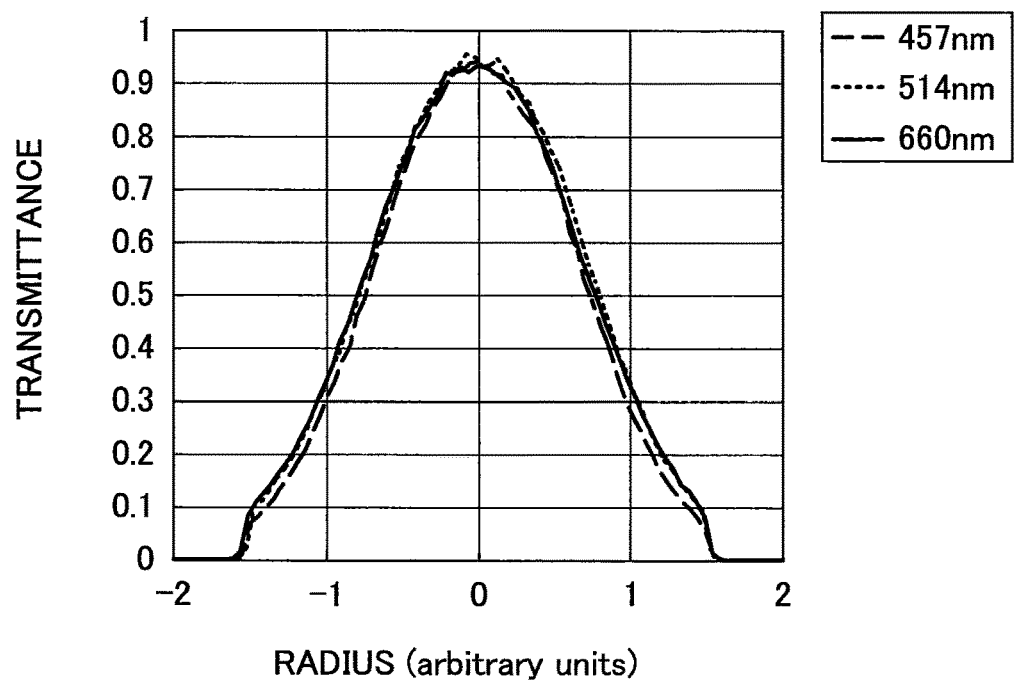
FIG. 4 is a diagram for explaining a transmittance property of the optical device in the first embodiment.

In this embodiment, the visible light absorbing part 20 is thinnest at a central part 20a thereof, and gradually becomes thicker from the central part 20a towards a peripheral part 20c. Because a thickness of the visible light absorbing part 20 gradually increases from the central part 20a towards the peripheral part 20c, a transmittance of visible light (hereinafter also referred to as "visible light transmittance") can be made to gradually decrease from the central part 20a towards the peripheral part 20c, as illustrated in FIG. 4. FIG. 4 is a diagram for explaining a transmittance property of the optical device in the first embodiment. Hence, the visible light absorbing part 20 has a concave shape with the concave central part 20a. In the optical device in this embodiment, the visible light transmittance is the highest at the central part 20a where the visible light absorbing part 20 is the thinnest. In other words, the central part 20a of the visible light absorbing part 20 transmits the visible light the most.

The visible light transmitting part 30 is embedded in the concave shape of the visible light absorbing part 20, and a surface (that is, a top surface in FIG. 3) of the visible light transmitting part 30 is approximately flat (or planar). For this reason, the visible light transmitting part 30 is thickest at a central part thereof, and is thinner from the central part towards a peripheral part thereof.

The visible light absorbing part 20 is thinnest at the central part 20a and is thickest at the peripheral part 20c, however, the visible light absorbing part 20 may include a part having a constant thickness. In other words, the central part 20a may have a constant thickness. Alternatively, an intermediate part 20b may have a constant thickness in a region in which an average transmittance of the visible light (hereinafter also referred to as "average visible light transmittance") is 50%, for example. Further, the visible light absorbing part 20 may have a constant thickness in a region in which the visible light transmittance is the lowest. The region of the visible light absorbing part 20 having the constant thickness may be appropriately modified depending on a design of the optical device.

In a case in which the visible light transmitting part 30 includes no ultraviolet light absorbing agent, the visible light absorbing part 20 partially absorbs the ultraviolet light, similarly to the visible light. However, at the central part 20a or the like where the visible light absorbing part 20 is thin, the ultraviolet light is also transmitted similarly to the visible light. When the ultraviolet light transmitted through the visible light absorbing part 20 exposes the optical device for a long period of time, there is a problem in that an optical property of the optical device may deteriorate and cause the visible light transmittance to decrease, for example.

However, an ultraviolet light absorbing material is added to the visible light transmitting part 30 in the optical device in this embodiment. Hence, the visible light transmitting part 30 can absorb the ultraviolet light, the optical device can eliminate the problem described above.

In this embodiment, the visible light transmittance is preferably high, while a transmittance of the ultraviolet light (hereinafter also referred to as "ultraviolet light transmittance") is preferably low. A description will now be given of the central part 20a in which no visible light absorbing material exists, and the intermediate part 20b in which the visible light absorbing material exists to a certain extent, such as the region in which the average visible light transmittance is 50%, for example.

The central part 20a has a configuration that permits transmission of the visible light of 400 nm to 700 nm, but blocks transmission of the ultraviolet light of 300 nm to 380 nm in order to prevent deterioration caused by the ultraviolet light. When the transmittance of light having the wavelength of 420 nm and the transmittance of light having the wavelength of 360 nm are denoted by T420 and T360, respectively, T420/T360 is preferably 3 or higher, and T420/T360 is more preferably 10 or higher.

Next, in the intermediate part 20b, the visible light absorbing material absorbs wavelengths of the ultraviolet light to the visible light. However, even when the average visible light transmittance of the visible light absorbing material is 50%, the ultraviolet light cannot be sufficiently absorbed solely by the visible light absorbing material. On the other hand, the optical device in this embodiment has a stacked structure formed by the visible light absorbing material and an ultraviolet light absorbing material. Hence, the ultraviolet light absorbing material always exists at the intermediate part 20b, to thereby sufficiently absorb the ultraviolet light. Similarly as in the case of the central part 20a, the ultraviolet light transmittance of the intermediate part 20b is preferably as low as possible, and T420/T360 is preferably 3 or higher in a region in which a visible light transmittance is highest. In addition, T420/T360 is more preferably 10 or higher.

From a different viewpoint of the optical device in this embodiment, a relationship T360<10% is preferably satisfied at every point on the optical device in this embodiment. By satisfying this relationship, the optical device in this embodiment, as well as other optical components arranged subsequent to the optical device in this embodiment, can be protected from deterioration caused by the ultraviolet light.

A base material used for the optical device in this embodiment is not limited to a particular material, as long as the base material can transmit visible light.

For example, Japanese Laid-Open Patent Publication No. 2011-227488 proposes a method of blocking the ultraviolet light in the optical device by adding absorptive capability to the base material. However, in a case in which such a base material is used, an arrangement becomes limited in that the base material needs to be arranged on an outer side of the stacked structure. For this reason, a freedom of design of the entire optical system may decrease. Hence, in this embodiment, the ultraviolet light is preferably absorbed by a visible light transmitting part and the visible light absorbing part, and the base material preferably transmits the ultraviolet light. More particularly, T360 of the base material is preferably 30% or higher, more preferably 50% or higher, and further more preferably 70% or higher. By employing such an arrangement, it is not only possible to provide resistance to the ultraviolet light, but also enable an ultraviolet curing process through the base material.

A glass base material or a resin base material may be used for the base material of this embodiment described above. Because the optical device requires a low haze value, it is also preferable that the base material that is used has a low haze value. The haze value is preferably 1% or lower, and more preferably 0.5% or lower. The haze value may be measured according to JIS-K7136, for example.

AN100 (product name) manufactured by Asahi Glass Company, Limited, borosilicate glass, crown glass, quartz glass, or the like may be used for the glass base material.

Thermoplastics such as polyethylene terephthalate (PET), polybutylene terephthalate (PBT), polycarbonate (PC), cycloolefin (COP), or the like, and thermosetting resins such as polyimide (PI), polyether-imide (PEI), polyamide (PA), polyamide-imide (PAI), or the like may be used for the resin base material.

The thickness of the base material is not limited to a particular thickness. From a viewpoint of making the base material light and thin, the thickness of the base material is preferably 0.01 mm to 1 mm, and more preferably 0.03 mm to 0.1 mm. In addition, when using the film, it is preferable to use a base material having a surface of the film subjected to an easy-adhesive process prior to forming the apodized filter.

In addition, the optical device in this embodiment may have a structure in which a transparent base material is removed after molding, and a material for absorbing the visible light and the material for transmitting the visible light are stacked. Furthermore, the base material may have a structure in which the visible light absorbing part 20 and the visible light transmitting part 30 are sandwiched between two transparent base materials.

The optical device in this embodiment may be stacked on a cover glass of a camera module, for example. The cover glass may be sapphire glass, white glass, chemically strengthened glass, or the like. The white glass may be borosilicate glass, crown glass, or the like including only a small amount of impurities such as iron. The chemically strengthened glass may include glass subjected to an ion exchange process on a surface of aluminosilicate glass, soda lime glass, or the like.

Next, a description will be given of the materials used in this embodiment.

(Visible Light Absorbing Part 20)

In the optical device in this embodiment, the visible light absorbing part 20 is formed from a material having an absorbing material that absorbs the visible light added to a transparent resin material that transmits the visible light.

(Visible Light Absorbing Material)

The visible light absorbing material may be organic coloring material or organic pigments, inorganic pigments, or the like. The organic coloring material or organic pigments include anthraquinone, phthalocyanine, benzimidazolone, quinacridone, azochelate, azo, isoindolinone, anthrapyrimidine, dibromoanthantrone, flavanthrone, perylene, perinone, quinophthalone, thioindigo, dioxazines, aniline black, Nigrosine Black®, or the like. The inorganic pigments include gold, silver, copper, tin, nickel, palladium, metal nanoparticles using alloys of such metals, barium sulfate, zinc oxide, lead sulfate, chrome yellow, red iron oxide, ultramarine, prussian blue, chromium oxide, black iron oxide, red lead, zinc sulfide, cadmium yellow, cadmium red, zinc, manganese violet, cobalt, magnetite, carbon black, carbon nanotube, graphene, titanium black, or the like.

(Visible Light Transparent Resin Material)

The transparent resin material may be thermoplastic resins, thermosetting resins, radiation curing resins, or the like. Examples of the thermoplastic resins include polyethylene terephthalate (PET), polyethylene naphthalate (PEN), polybutylene terephthalate (PBT), polycarbonate (PC), cycloolefin (COP), or the like. Examples of the thermosetting resins include polyimide (PI), polyether-imide (PEI), polyamide (PA), polyamide-imide (PAI), or the like. From the viewpoint of formability, the radiation curing resins include acrylic resins, epoxy resins, or the like. When the thermosetting resin or the radiation curing resin is used for the transparent resin material, an absorbing material may be added at a stage where the resin is in a form of a polymeric precursor compound (hereinafter also referred to as polymerizable compound) such as oligomer and monomer, and the resin may be cured after the addition of the absorbing material. From the viewpoint of formability, the radiation curing resin is preferably used for the transparent resin material. By using the radiation curing resin for the transparent resin material, the radiation curing resin may be cured on the cover base material, and a high degree of surface flatness of the visible light transparent resin material can be obtained. Examples of the radiation curing resin include ultraviolet curing resins that cure when irradiated by the ultraviolet light, or the like. The polymerizable compounds that may be used for the visible light transparent resin material are not limited to particular compounds, as long as the compounds are cured by a polymerization reaction and become hard. For example, radical polymerizable curing resins, cation polymerizable curing resins, and radical polymerizable curing compounds (monomers) may be used for the visible light transparent resin material without particular limitations. From the viewpoint of a rate of polymerization and the formability which will be described later, the radical polymerizable curing compounds (monomers) are particularly preferable for use as the visible light transparent resin material. Examples of the radical polymerizable curing resins include resins having a functional group with a carbon-carbon unsaturated double bond, such as (meth)-acryloyloxy group, (meth)-acryloylamino group, (meth)-acryloyl group, allyloxy group, allyl group, vinyl group, vinyloxy group, or the like.

In a case in which the ultraviolet curing is performed, it is preferable to use an appropriate photopolymerization initiator selected from acetophenones, benzophenones, benzoins, benzyls, Michler's ketones, benzoin alkyl ethers, benzyl dimethyl ketals, thioxanthones, or the like. One kind of photopolymerization initiator or a combination of two or more kinds of photopolymerization initiators may be used. An amount of the photopolymerization initiator is preferably 0.01 mass % to 5 mass %, and more preferably 0.1 mass % to 2 mass %.

In this embodiment, the polymerizable compound is not limited to a particular compound, and examples of the polymerizable compound include monofunctional compounds, bifunctional compounds, trifunctional compounds, tetrafunctional compounds, hexafunctional compounds, or the like. The monofunctional compounds may include ethoxylation o-phenyl-phenol-acrylate, methacrylate 2-(perfluorohexyl) ether, cyclohexyl-(meth)-acrylate, isobornyl-(meth)-acrylate, tricyclodecane-(meth)-acrylate, tricyclodecane-methanol-(meth)-acrylate, tricyclodecane-ethanol-(meth)-acrylate, 1-adamantyl-acrylate, 1-adamantyl-methanol-acrylate, 1-adamantyl-ethanol-acrylate, 2-methyl-2-adamantyl-acrylate, 2-ethyl-2-adamantyl-acrylate, 2-propyl-2-adamantyl-acrylate, dicyclopentenyl-acrylate, or the like. The bifunctional compounds may include 9,9-bis [4-(2-acryloyloxyethoxy)-phenyl]fluorene, diethylglycol-di-(meth)-acrylate, 1,3-butanediol-di-(meth)-acrylate, 1,4-butanediol-di-(meth)-acrylate, neopentylglycol-di-(meth)-acrylate, isobonyl-di-(meth)-acrylate, tricyclodecane-di-(meth)-acrylate, tricyclodecane-dimethanol-di-(meth)-acrylate, tricyclodecane-dimethanol-di-(meth)-acrylate, adamantane-diacrylate, adamantane-dimethanol-diacrylate, tricyclodecane-dimethanol-diacrylate, or the like. The trifunctional compounds may include trimethylolpropane-tri-(meth)-acrylate, or the like. The tetrafunctional compounds may include pentaerythritol-tetra-(meth)-acrylate, or the like. The hexafunctional compounds may include dipentaerythritol-hexa-(meth)-acrylate, or the like. One kind of polymerizable compound or a combination of two or more kinds of polymerizable compounds may be used. In a case in which only the monofunctional compound is used, a cohesion failure may occur at the time of the release from the mold after the molding, and for this reason, it is preferable to use a multifunctional compound that is at least bifunctional. An amount of the multifunctional compound within a composition of the polymerizable compound is preferably 1 wt % or higher and 90 wt % or lower, and more preferably 10 wt % or higher and 80 wt % or lower. In a case in which the amount of the multifunctional compound is lower than 1 wt %, the effect of improving the cohesion failure is insufficient. On the other hand, in a case in which the amount of the multifunctional compound is higher than 90 wt %, shrinkage after the polymerization may become large to introduce problems.

In addition, it is possible to use polymerizable compounds other than compounds having the functional group with the carbon-carbon unsaturated double bond, such as the epoxy group that generates a ring-opening reaction. Such compounds have a small polymerization shrinkage, and not only enable precision molding using the mold, but also reduce warp. Although not illustrated, the cohesion failure may occur at the time of the release from the mold after the molding when only the monofunctional compound is used for the polymerizable compound, and it is preferable that the polymerizable compound includes a multifunctional compound that is at least bifunctional. An amount of the multifunctional compound within the composition of the polymerizable compound is preferably 1 wt % or higher and 90 wt % or lower, and more preferably 10 wt % or higher and 80 wt % or lower. Amongst these photocuring absorbing materials, each photocuring absorbing material may be used independently, or a combination of a plurality of photocuring absorbing materials may be used, for the purposes of reducing interface reflection by reducing a difference between refractive indexes of the photocuring absorbing material and the base material, adjusting a viscosity, or the like.

The photopolymerization initiator is not limited to a particular initiator. Examples of the photopolymerization initiator include 1-hydroxy-cyclohexyl-phenyl-ketone (product name: IRGACURE 184), 2-methyl-1-(4-methylthiophenyl)-2-morpholinopropane-1-on (product name: IRGACURE 907), bis(η5-2,4-cyclopentadiene-1-yl)-bis(2,6-difluoro-3-(1H-pyrrol-1-yl)-phenyl) titanium (product name: IRGACURE 784), oxyphenylacetic acid, a mixture (product name: IRGACURE 754) of 2-[2-oxo-2-phenylacetoxyethoxy]ethylester, oxyphenylacetic acid and 2-(2-hydroxyethoxy)ethylester, 2,4,6-trimethylbenzoil-diphenylphospheneoxide (product name: LUCIRIN TPO), or the like.

(Ultraviolet Light Absorbing Material)

Next, a description will be given of the ultraviolet light absorbing material that is added to the visible light transmitting part 30. The visible light transmitting part 30 may be formed by adding the ultraviolet light absorbing material to the visible light transparent resin material described above. The ultraviolet light absorbing material is a material that transmits the visible light and absorbs the ultraviolet light.

(Ultraviolet Light Absorbing Material: Organic Material)

Examples of an organic material that may be used for the ultraviolet light absorbing material include triazines, benzotriazoles, benzophenones, cyanoacrylates, azomethines, indoles, salicylates, anthracenes, or the like.

Examples of the triazine ultraviolet light absorbing materials include a reaction product (for example, TINUVIN 400 (product name) manufactured by Ciba Japan and represented by the following chemical formula (1)) of 2-(4,6-bis(2,4-dimethylphenyl)-1,3,5-triazine-2-yl)-5-hydroxyphenyl and oxirane[(C10-C16 primarily C12-C13 alkyloxy)methyl]oxirane, a reaction product (for example, TINUVIN405 (product name) manufactured by Ciba Japan and represented by the following chemical formula (2)) of 2-(2,4-dihydroxyphenyl)-4,6-bis-(2,4-dimethylphenyl)-1,3,5-triazine and (2-ethylhexyl)-glycidic ester, 2,4-bis[2-hydroxy-4-butoxyphenyl]-6-(2,4-dibutoxyphenyl)-1,3,5-triazine (for example TINUVIN 460 (product name) manufactured by Ciba Japan and represented by the following chemical formula (3)), or the like.

Examples of the benzotriazoles include 2-(2-hydroxy-5-t-butylphenyl)-2H-benzotriazole (for example, TINUVIN PS (product name) manufactured by Ciba Japan and represented by the following chemical formula (4)), 2-(2H-benzotriazole-2-yl)-4,6-di-t-pentylphenol (for example, TINUVIN 328 (product name) manufactured by Ciba Japan and represented by the following chemical formula (5)), benzenepropanoic acid 3-(2H-benzotriazole-2-yl)-5-(1,1-dimethylethyl)-4-hydroxy C7-9 side-chain and linear alkylester (for example, TINUVIN 384-2 (product name) manufactured by Ciba Japan and represented by the following chemical formula (6)), 2-(2H-benzotriazole-2-yl)-4,6-bis(1-methyl-1-phenylether) phenol (for example, TINUVIN 900 (product name) manufactured by Ciba Japan and represented by the following chemical formula (7)), 2-(2H-benzotriazole-2-yl)-6-(1-methyl-1-phenylether)-4-(1,1,3,3-tetramethylbutyl) phenol (for example, TINUVIN 928 (product name) manufactured by Ciba Japan and represented by the following chemical formula (8)), or the like.

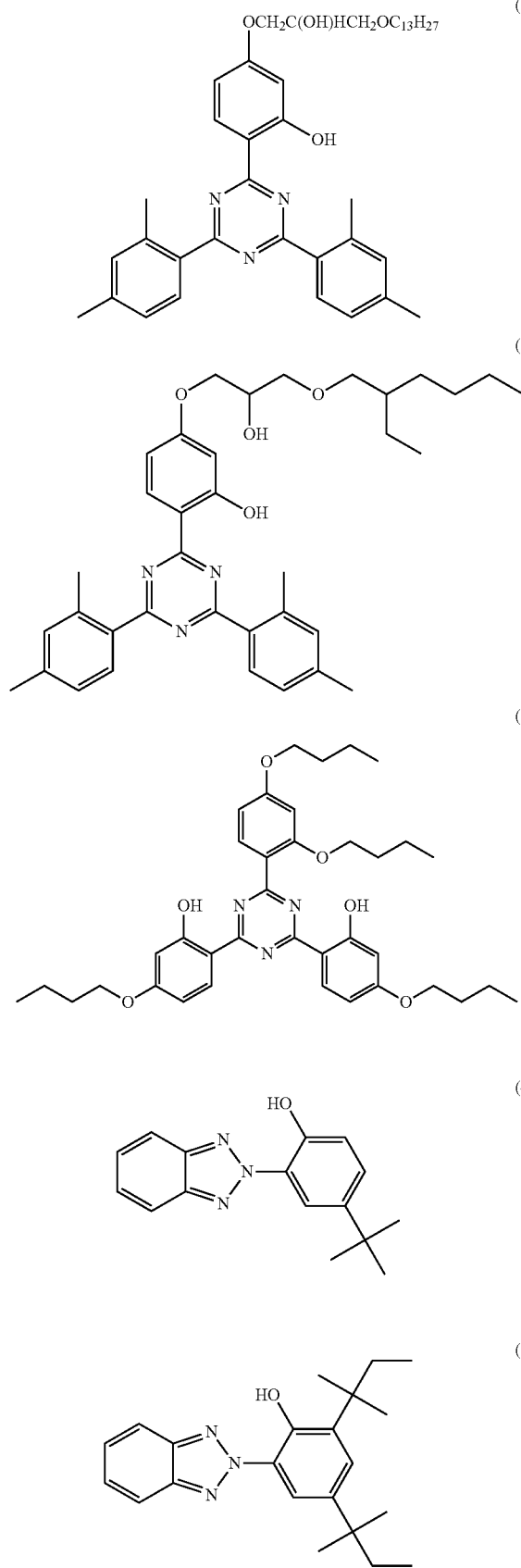

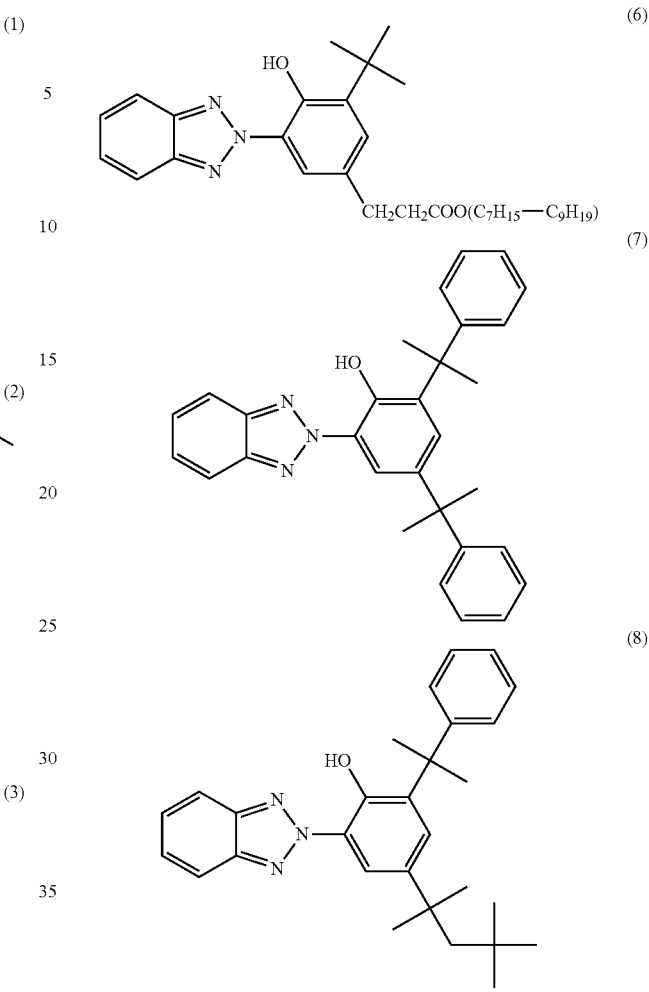

Examples of the benzophenone ultraviolet light absorbing materials include 2,4-dihydroxybenzophenone, 2,2',3-trihydroxybenzophenone, 2,2',4,4'-tetrahydroxybenzophenone, 2,4-dihydroxy-2',4'-dimethoxybenzophenone, 2-hydroxy-4-n-octoxybenzophenone, or the like.

A maximal absorption wavelength of light for these examples of the organic ultraviolet light absorbing agent is in a range of 325 nm to 425 nm, and is generally in a range of 325 nm to 390 nm in many cases. Hence, these examples of the organic ultraviolet light absorbing agent has the absorptive capability even with respect to the ultraviolet light in the relatively long-wavelength range.

In this embodiment, one kind of ultraviolet light absorbing agent may be used independently, or a combination of two or more kinds of ultraviolet light absorbing agents may be used. In addition, amongst the ultraviolet light absorbing agents, the triazine or benzotriazole ultraviolet light absorbing agent may be preferably used in this embodiment.

A content of the ultraviolet light absorbing material with respect to a visible light transparent material in this embodiment is not limited to a particular value as long as the content is within a range of this embodiment. The content of the ultraviolet light absorbing material with respect to the visible light transparent material is preferably 0.5 wt % to 20 wt %, and more preferably 2 wt % to 10 wt %. When this content is less than 0.5 wt %, the ultraviolet light cannot be absorbed sufficiently, and it becomes difficult to suppress the deterioration caused by the exposure to the ultraviolet light. On the other hand, when this content exceeds 20 wt %, a defect such as a bleed-out, which should preferably be avoided, may occur after the formation of the layer or film.

(Ultraviolet Light Absorbing Material: Inorganic Material)

Inorganic materials that may be used for the ultraviolet light absorbing material include inorganic nanoparticles, such as nanoparticles of $SnO_2$, $CeO_2$, $WO_3$, $ZnO_2$, $TiO_2$, $Nb_2O_5$, $SrTiO_3$, $BaTiO_3$, $Ta_2O_5$, ITO, or the like, for example. These inorganic nanoparticles may be evenly dispersed by a known technique and used.

(Ultraviolet Light Absorbing Resin)

In addition, the visible light transmitting part 30 may include an ultraviolet light absorbing resin that absorbs the ultraviolet light. Examples of the ultraviolet light absorbing resin include PEN (polyethylene naphthalate), polyimide, polyamide-imide, modified-acrylic ultraviolet light absorbing resin, Vanaresin UVA-5080, Vanaresin UVA-55T, Vanaresin UVA-7075, Vanaresin UVA-73T (respectively manufactured by Shin-Nakamura Chemical Co., Ltd.), or the like. In addition, the above ultraviolet light absorbing resins may be modified and used as a comonomer, in order to obtain a polymerized monomer. Examples of the comonomer include 2-[2-hydroxy-5-[2-(methacryloyloxy)ethyl]phenyl]-2H-benzotriazole or the like.

(Other Additives)

Other components or additives, such as an antioxidant, a light stabilizer, or the like may be added to the ultraviolet light absorbing material, in order to use an appropriate combination of compositions that maximizes the resistance with respect to the ultraviolet light by the synergistic effect of the additives and the ultraviolet light absorbing material that is used.

Hindered phenol compounds, phosphorus compounds, sulfur compounds, and amine compounds may preferably be used for the antioxidant. From the viewpoint of the visible light transparency, hindered compounds are preferable for use as the antioxidant. The hindered phenol compounds have a substituent group on both second and sixth positions with respect to the phenolic hydroxyl group. The methyl group or t-butyl group is particularly preferable as the substituent group. The hindered phenol compound may be any of monophenol, bisphenol, and polyphenol. The hindered phenol compound may be appropriately selected from compounds that are available on the market as phenolic antioxidants. One kind of phenolic antioxidant may be used independently, or a combination of two or more kinds of phenolic antioxidants may be used for the hindered phenol compound.

Hindered amine compounds may be used for the light stabilizer. The hindered amine compounds in this embodiment is preferably a 2,2'-6,6'-tetraalkylpeperidine derivative. The hydrogen atom, alkyl group, and alkoxy group are preferable as a substituent group on the nitrogen atom. In addition, compounds having the alkyl group or the phenyl group as the substituent group on the second and sixth positions are preferably used for the hindered amine compounds. One kind of hindered amine compound may be used independently, or a combination of two or more kinds of hindered amine compounds may be used for the light stabilizer.

These components are preferably 10 mass % or less with respect to the visible light transparent material, and more preferably 5 mass % or less. When these components exceed 10 mass % with respect to the visible light transparent material, these additives may bleed-out when molding the visible light transparent material.

Second Embodiment (Method of Manufacturing Optical Device)

Next, a description will be given of a method of manufacturing the optical device in this embodiment.

The method of manufacturing the optical device in this embodiment is not limited to a particular method as long as the combined thickness of the visible light absorbing part and the ultraviolet light absorbing part can be maintained approximately constant, while a concentration of the visible light absorbing material is maintained constant in the structure in which the visible light absorbing part having the thickness that increases from the central part thereof towards the peripheral part thereof is stacked on the visible light transmitting part in which the ultraviolet light absorbing material is added to the visible light transparent material. For example, one of the following methods (A) through (D) may be employed.

Method (A)

In this manufacturing method, the visible light absorbing part is formed by injection molding, using a mold having a shape such that parts with different thicknesses are located at arbitrary positions with arbitrary areas. After releasing (or separating) the visible light absorbing part that is formed from the mold, a physically smooth base material is used to fill the visible light transmitting part including the ultraviolet light absorbing material, so as to obtain the optical device of this embodiment.

Method (B)

In this manufacturing method, the visible light absorbing material is dissolved or dispersed in a solution, and thereafter the solution is coated on a mold that is patterned to a convex shape. Next, the solvent is evaporated by heating or decompression, so as to mole the visible light absorbing material to an arbitrary shape. Examples of the coating method that may be used include spin-coating, dip-coating, spray-coating, flexographic printing, screen printing, gravure printing, roll coating, meniscus-coating, die coating, or the like. After releasing the visible light absorbing part that is formed from the mold, an optically flat transparent base material is used to fill the visible light transmitting part including the ultraviolet light absorbing material, so as to obtain the optical device of this embodiment.

Method (C)

In this manufacturing method, the visible light absorbing material is pressed with a mold having convex part at a central part thereof against the visible light absorbing material, in order to form a concave part. Next, the visible light transparent material is filled into the concave part, to thereby obtain the optical device of this embodiment. In this method of manufacture, the photopolymerizable compound described above is preferably used together with the visible light absorbing member and the visible light transmitting part, for the purposes of reducing a percentage of the process time that uses the mold.

Method (D)

In this manufacturing method, the visible light absorbing material is formed by the coating method described above, in order to obtain a film of the visible light absorbing material with a uniform thickness on the base material. A method such as the hot stamping or the like is used to press, while heating, an engraved roller or sheet mold against the film of the visible light absorbing material, so as to provide a thickness distribution on the film of the visible light absorbing material. Thereafter, the visible light transparent material including the ultraviolet light absorbing material is filled into a concave part of the thickness distribution on the film of the visible light absorbing material.

In the manufacturing methods (A) through (D) described above, the visible light transparent material is filled into the concave part, and this visible light transparent material is preferably a radiation curing resin. This is because, when the radiation curing resin is used, it becomes possible to provide a cover base material and cure the same, in order to increase the degree of flatness of the surface of the radiation curing resin forming the visible light transparent material. The degree of flatness in an effective region of the optical device is preferably 30 nm or less, and more preferably 10 nm or less. The haze can be reduced by realizing the high degree of flatness. The degree of flatness in this example refers to an arithmetic average roughness Ra.

The cover base material may be used as it is as a part of the optical device, or may be released from the mold after curing by performing an appropriate releasing (or separating) process. From the viewpoint of reducing the weight and thickness, the cover base material is preferably released from the mold after the curing. In addition, from the viewpoint of enabling the ultraviolet curing through the cover base material, the cover base material preferably transmits the ultraviolet light. More particularly, the T360 of the cover base material is 50% or higher. Glass is preferably used as such a cover base material, and quartz glass is particularly preferable from the viewpoint of achieving the desired ultraviolet light transmittance and the desired degree of flatness.

In addition, a surface geometry (or shape) can be provided by using the radiation curing resin for the visible light transparent material. For example, the ultraviolet curing can be performed using the cover base material that is preformed to a moss-eye type structure, and the cover base material can then be released from the mold to provide a low-reflection function to the visible light transparent material. In this case, a height of the concavo-convex part is preferably in a range of 150 nm to 280 nm, and a period of the concavo-convex part is preferably in a range of 150 nm to 250 nm. The height and the period of the concavo-convex part may be appropriately modified within the ranges described above, in order to obtain the desired reflection property.

In the manufacturing methods (A) through (D) described above, the concave part is formed in the visible light absorbing part, and the visible light transparent material is thereafter filled into the concave part. However, the visible light transmitting part may be formed first, and the visible light absorbing material may thereafter be filled. In this latter case, the mold or the concavo-convex pattern of the mold may be designed to be complementary to that of the first case. The mold may be made of an optimum material by taking into consideration the formability, the releasability, or the like.

Third Embodiment

Next, a description will be given of a third embodiment. In this embodiment, the optical device in the first and second embodiments described above is used for an imaging apparatus. The imaging apparatus in this embodiment may be implemented in a portable electronic apparatus having a communication function, such as a smartphone, a mobile phone, or the like.

Figure 13A:
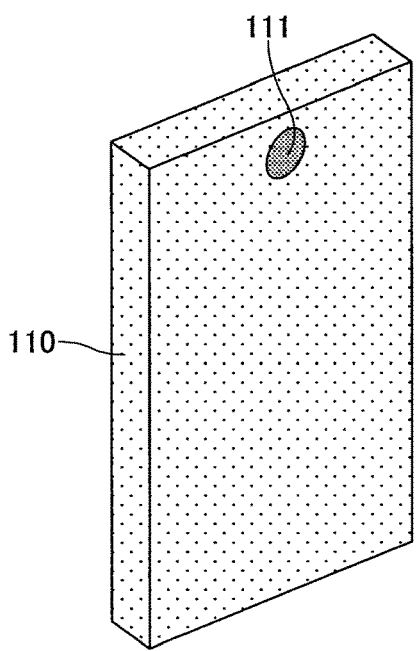
FIGS. 13A and 13B are diagrams for explaining a smartphone implemented with an imaging apparatus in a third embodiment.
Figure 13B:
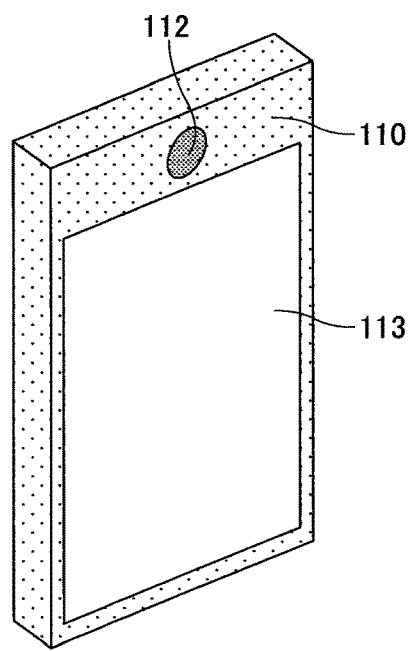

FIGS. 13A and 13B are diagrams for explaining a smartphone implemented with an imaging apparatus in the third embodiment. As illustrated in FIGS. 13A and 13B, the imaging apparatus in this embodiment is implemented as a main camera 111 and a sub camera 112 of a smartphone 110. In this embodiment, the main camera 111 is mounted on a surface of the smartphone 110 on the opposite side from a surface of the smartphone 110 provided with a display screen 113, and the sub camera 112 is provided on the surface of the smartphone 110 provided with the display screen 113. FIG. 13A illustrates a perspective view of a back surface side of the smartphone 110, and FIG. 13B illustrates a perspective view of a display screen 113 side of the smartphone 110.

Figure 14:
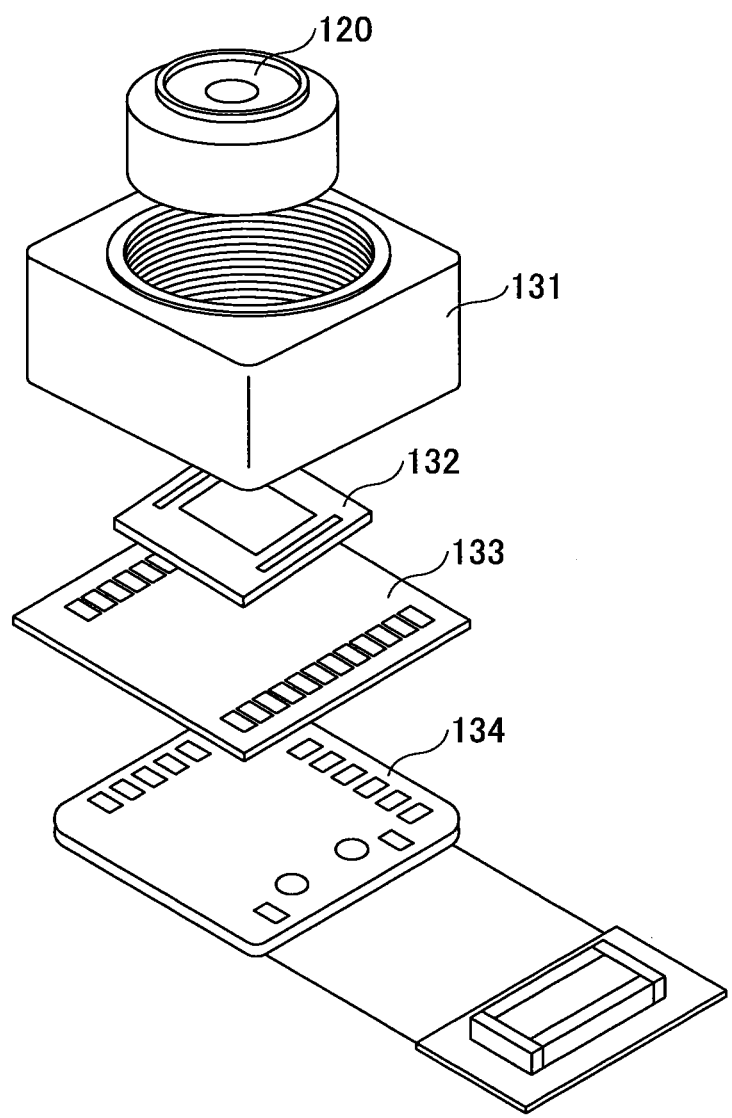
FIG. 14 is a diagram for explaining the imaging apparatus in the third embodiment.

FIG. 14 is a diagram for explaining the imaging apparatus in the third embodiment. As illustrated in FIG. 14, the imaging apparatus in this embodiment, implemented as the main camera 111 and the sub camera 112, includes an optical system 120, an automatic focusing unit 131, an image sensor 132 that forms an imaging device, a substrate 133, a flexible printed circuit 134, or the like. The optical system 120 is mounted on the automatic focusing unit 131, and an automatic focusing operation is performed by controlling a movement of the optical system 120 by the automatic focusing unit 131. The image sensor 132 may be formed by a CMOS (Complementary Metal Oxide Semiconductor) sensor or the like, and detects an image of light incident thereto through the optical system 120.

Figure 15:
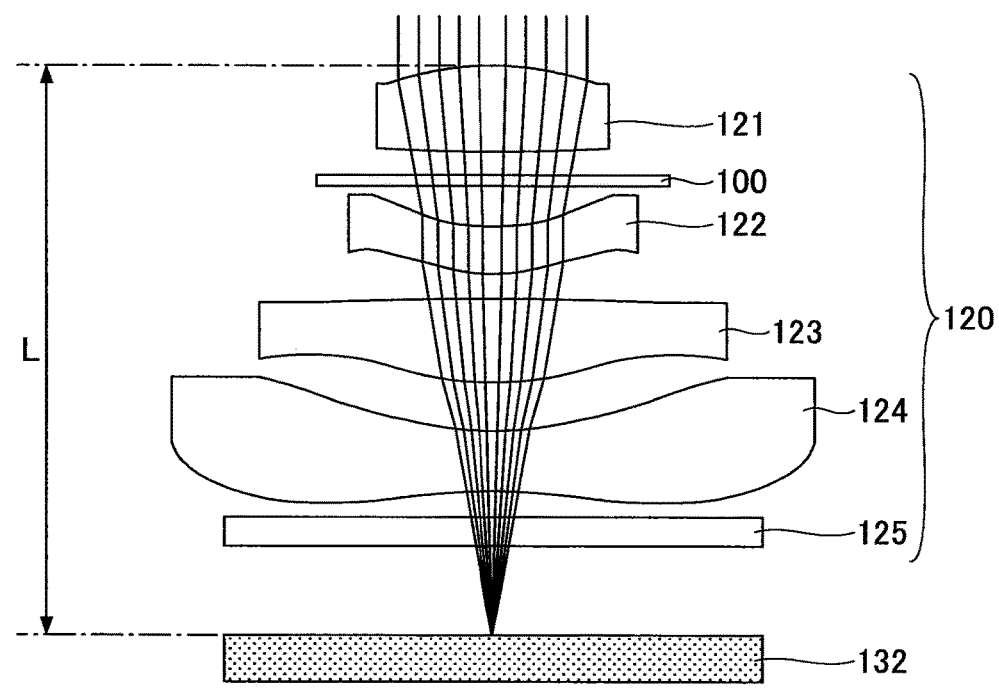
FIG. 15 is a diagram for explaining an optical system of the imaging apparatus in the third embodiment.

FIG. 15 is a diagram for explaining the optical system of the imaging apparatus in the third embodiment. As illustrated in FIG. 15, the optical system 120 includes a first lens 121, an optical device 100 of the first embodiment, a second lens 122, a third lens 123, a fourth lens 124, and an infrared cutting filter 125.

In the optical filter 120, the light incident to the first lens 121 reaches the image sensor 132 through the second lens 122, the third lens 123, the fourth lens 124, and the infrared cutting filter 125.

In this embodiment, the light incident to the first lens 121 is removed of the ultraviolet light having the wavelength in the range of 300 nm to 380 nm in the optical device 100, and thereafter passes through the second lens 122, the third lens 123, the fourth lens 124, and the infrared cutting filter 125. For this reason, even in a case in which the second lens 122, the third lens 123, the fourth lens 124, and the infrared cutting filter 125 are made of a resin material or the like that is easily deteriorated when exposed to the ultraviolet light, there is virtually no deterioration in the optical properties of the optical system 120. For this reason, the optical system 120 can be formed at a low cost.

Further, the present invention is not limited to these embodiments, therefore various variations, modifications, or substitutions may be made without departing from the scope of the present invention.

Exemplary Implementations (Exemplary Implementations of Manufacture of Optical Device)

First, a description will be given of a preparation of the visible light absorbing material. Dicyclopentanyl acrylate and tricyclodecane dimethanol diacrylate are added, as polymerizable compounds, to a particle dispersion including carbon black and titanium black, and agitated until a uniform mixture is obtained. Next, 1,2-octanedione-1-[4-(phenylthio)-2-(o-benzoyloxime)] is added to the mixture as a radical initiator. Thereafter, a solvent included in the particle dispersion is evaporated by decompression, so as to obtain the visible light absorbing material.

Next, a description will be given of a preparation of the visible light transparent material. 1-Hydroxy-cyclohexylphenyl-ketone is added, as a radical initiator, to dicyclopentanyl acrylate and tricyclodecane dimethanol diacrylate which are polymerizable compounds, and an ultraviolet light absorbing material is further added and agitated until a uniform mixture is obtained as the visible light transparent material. Composition ratios of the ultraviolet light absorbing material are as illustrated in Table 1 which will be described later.

Next, a description will be given of the manufacture of the optical device in this embodiment. First, a quartz glass mold made of quartz glass is prepared. This quartz glass mold has a convex part formed at a central part thereof, and a concave part is formed in a periphery of the convex part. A curved surface at the surface of the convex part is formed to satisfy $Z(r)=A \times r^2$, where r denotes a length from a center along a radial direction, and $Z(r)$ denotes a position on the curved surface, and A denotes a constant. The convex part has a height of 30 µm in this example.

Next, drops of the visible light absorbing material obtained in the manner described above and amounting to 0.7 mg are supplied to the quartz glass mold.

Then, quartz glass having a thickness of approximately 300 µm is placed on top of the visible light absorbing material to cover the visible light absorbing material, and ultraviolet light of 300 mW/cm² is irradiated for 100 seconds by an ultraviolet light irradiating apparatus, such as a fiber type UV exposure apparatus (spot light source LC6 manufactured by Hamamatsu Photonics K.K.), in order to cure the visible light absorbing material to form a visible light absorbing material part.

Next, the cured visible light absorbing material part is released from the quartz glass mold, and subjected to a heat treatment at 135° C. for 1 hour.

Next, drops of the visible light transparent material having the various compositions of the ultraviolet light absorbing material and amounting to 0.5 mg are supplied to the concave part of the visible light absorbing material part, and quartz glass having a thickness of approximately 300 µm is placed on top of the visible light transparent material to cover the visible light transparent material, and ultraviolet light of 300 mW/cm² is irradiated for 100 seconds by the ultraviolet light irradiating apparatus, such as the fiber type UV exposure apparatus (spot light source LC6 manufactured by Hamamatsu Photonics K.K.), in order to cure the visible light transparent material and form a visible light transparent material part. The surface flatness of the visible light absorbing material part after being released from the quartz glass mold, measured by an apparatus Newview 6200 (product name) manufactured by Zygo Corporation, is 2 nm.

Figure 5:
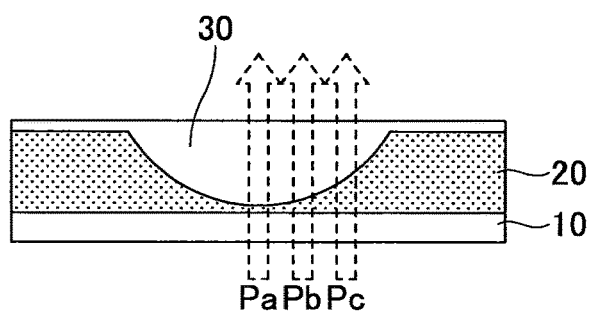
FIG. 5 is a diagram for explaining the optical device that is manufactured.

Next, a description will be given of the optical properties or the like of the optical device in which the visible light transparent material are varied. The manufacturing technique is described above. FIG. 5 is a diagram for explaining the optical device that is manufactured.

More particularly, for comparison purposes, an optical device S1, having the visible light transmitting part that is not added with the ultraviolet light absorbing material, is manufactured. In addition, an optical device S2 having the visible light transmitting part 30 that is added with 5 wt % of TINUVIN400 as the ultraviolet light absorbing material, an optical device S3 having the visible light transmitting part 30 that is added with 5 wt % of TINUVIN460 as the ultraviolet light absorbing material, and an optical device S4 having the visible light transmitting part 30 that is added with 5 wt % of TINUVIN384-2 as the ultraviolet light absorbing material, are manufactured. The optical device S1 corresponds to a comparison example, and the optical devices S2, S3, and S4 correspond to exemplary implementations.

Figure 6:
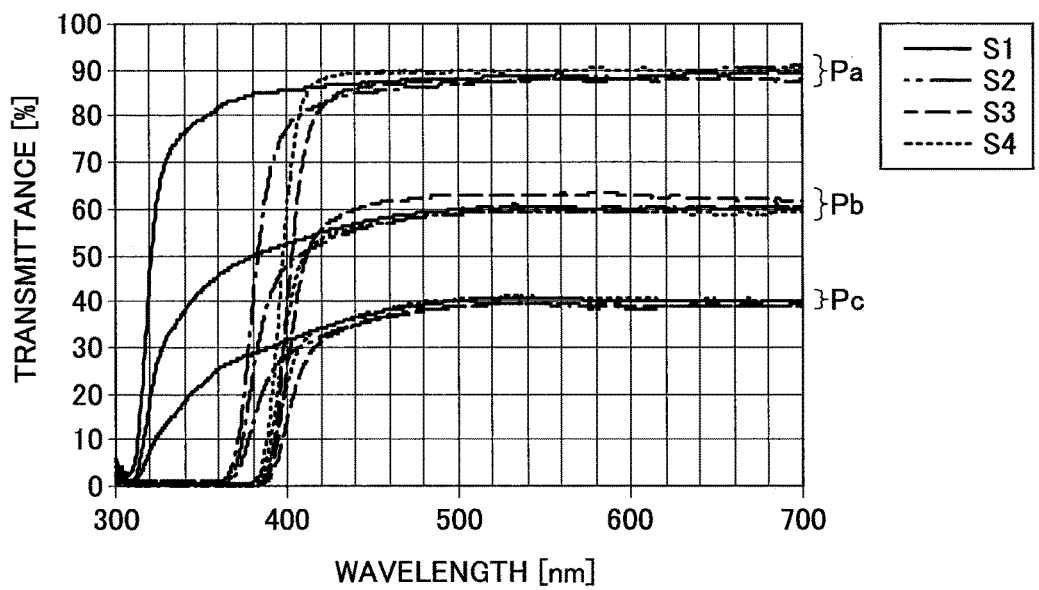
FIG. 6 is a diagram for explaining the transmittance property of the optical devices that are manufactured.
Figure 7:
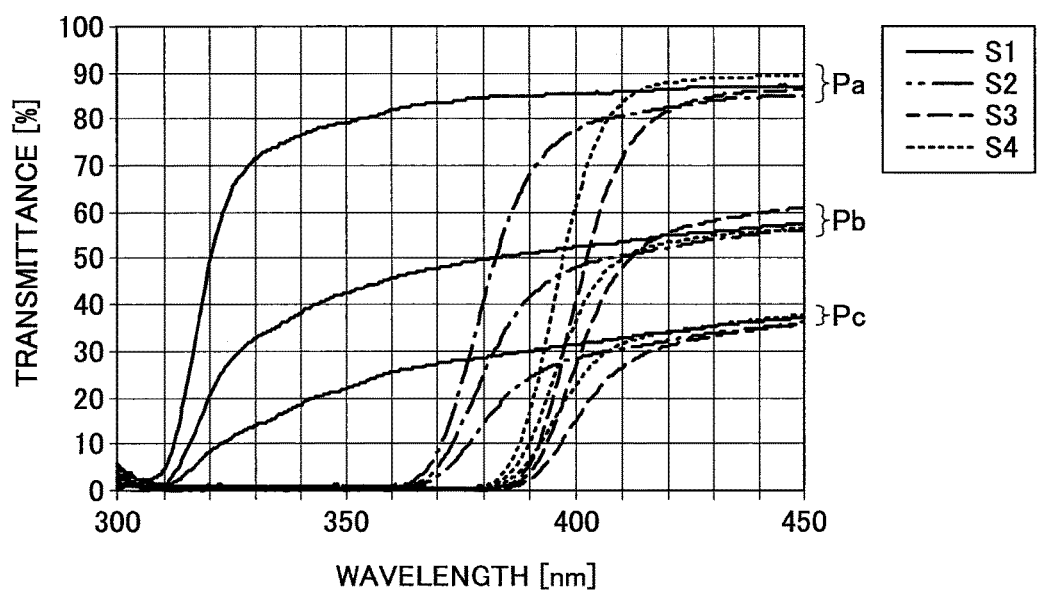
FIG. 7 is a diagram illustrating a part of FIG. 6 on an enlarged view.

FIGS. 6 and 7 illustrate measured results of the transmittance at 3 different positions Pa, Pb, and Pc illustrated in FIG. 5 for each of the manufactured optical devices S1 through S4. FIG. 6 is a diagram for explaining the transmittance property of the optical devices that are manufactured, and FIG. 7 is a diagram illustrating a part of FIG. 6 on an enlarged view. More particularly, FIG. 7 illustrates a wavelength region of 300 nm to 450 nm illustrated in FIG. 6 on an enlarged scale.

As illustrated in FIGS. 6 and 7, in the case of the optical device S1 having the visible light transmitting part that is not added with the ultraviolet light absorbing material, the ultraviolet light having the wavelength in a range of 300 nm to 380 nm is transmitted through the optical device S1. For example, the transmittance measured at the position Pa for the wavelength of 360 nm is 70% or higher. On the other hand, in the case of the optical device S2 having the visible light transmitting part that is added with the ultraviolet light absorbing material, the transmittance of the ultraviolet light having the wavelength in a range of 300 nm to 370 nm is 10% or lower. In addition, in the case of the optical device S3 having the visible light transmitting part that is added with the ultraviolet light absorbing material, the transmittance of the ultraviolet light having the wavelength in a range of 300 nm to 390 nm is 10% or lower. In the case of the optical device S4 having the visible light transmitting part that is added with the ultraviolet light absorbing material, the transmittance of the ultraviolet light having the wavelength in a range of 300 nm to 380 nm is 10% or lower. The transmittance of 10% or lower is defined as a maximum transmittance that is 10% or lower for the wavelength region of 300 nm to 380 nm.

Next, a description will be given of a case in which the composition ratio of the ultraviolet light absorbing material added to the visible light transmitting part 30 is varied in the optical devices S2 and S3.

More particularly, an optical device S2a having the visible light transmitting part 30 that is added with 2 wt % of TINUVIN400 as the ultraviolet light absorbing material, and an optical device S2b having the visible light transmitting part 30 that is added with 0.5 wt % of TINUVIN400 as the ultraviolet light absorbing material, are manufactured. The optical device S2a corresponds to an exemplary implementation, and the optical device S2b corresponds to a comparison example.

Figure 8:
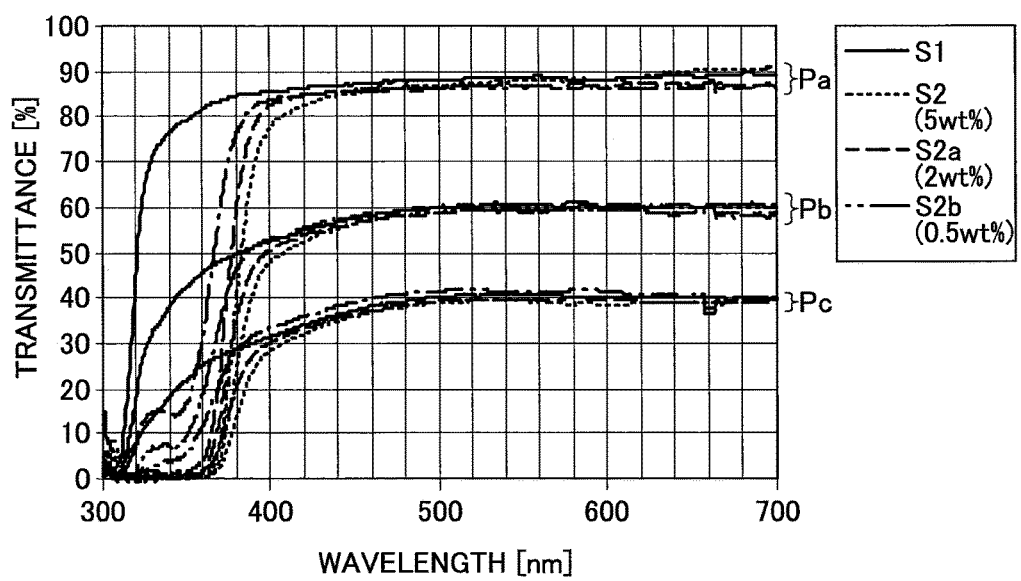
FIG. 8 is a diagram for explaining the transmittance property of the optical devices that are manufactured.
Figure 9:
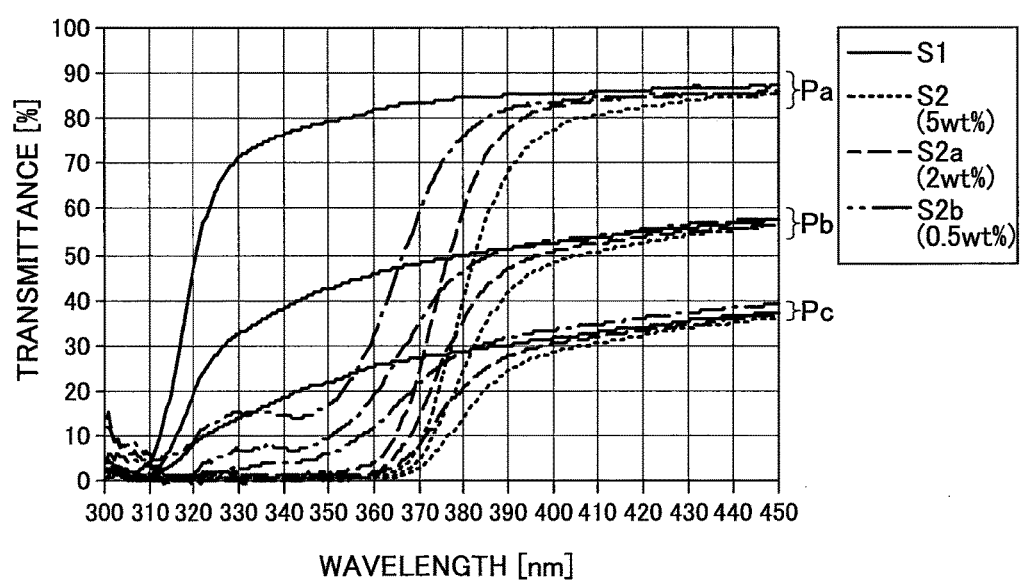
FIG. 9 is a diagram illustrating a part of FIG. 8 on an enlarged scale.

FIGS. 8 and 9 illustrate measured results of the transmittance for each of the manufactured optical devices S2, S2a and S2b. FIG. 8 is a diagram for explaining the transmittance property of the optical devices that are manufactured, and FIG. 9 is a diagram illustrating a part of FIG. 8 on an enlarged scale. More particularly, FIG. 9 illustrates the wavelength region of 300 nm to 450 nm illustrated in FIG. 8 on an enlarged scale.

As illustrated in FIGS. 8 and 9, as the composition ratio of TINUVIN400 that is the ultraviolet light absorbing material added to the visible light transmitting part 30 decreases, the wavelength region transmitted through the optical device spreads to the short wavelength side. From the results illustrated in FIGS. 8 and 9, the composition ratio of TINUVIN400 that is the ultraviolet light absorbing material added to the visible light transmitting part 30 is insufficient at 0.5 wt %, and it may be seen that this composition ratio needs to be at least 2 wt %. When this composition ratio is 2 wt %, the transmittance of the ultraviolet light having the wavelength of 360 nm can be maintained to be 10% or lower.

Figure 10:
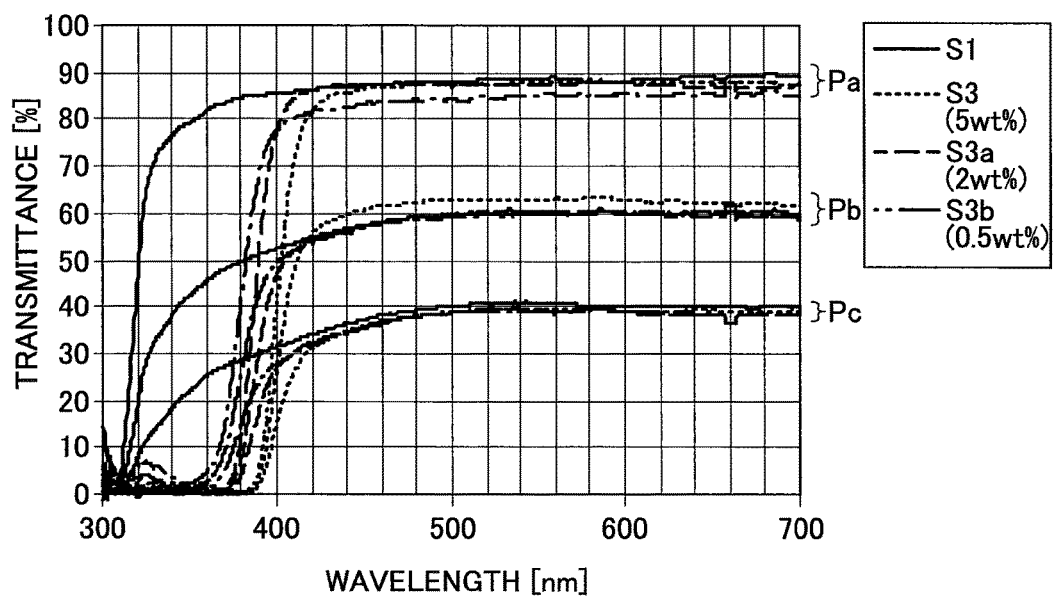
FIG. 10 is a diagram for explaining the transmittance property of the optical devices that are manufactured.
Figure 11:
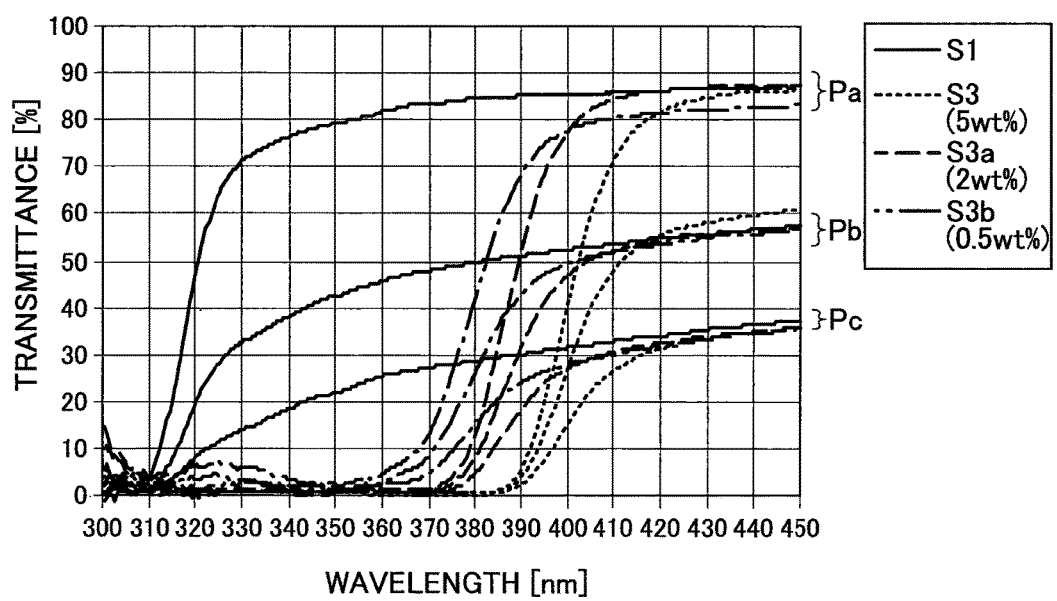
FIG. 11 is a diagram illustrating a part of FIG. 10 on an enlarged scale.

Next, an optical device S3a having the visible light transmitting part 30 that is added with 2 wt % of TINU-VIN460 as the ultraviolet light absorbing material, and an optical device S3b having the visible light transmitting part 30 that is added with 0.5 wt % of TINUVIN460 as the ultraviolet light absorbing material, are manufactured. The optical devices S3a and S3b correspond to exemplary implementations. FIGS. 10 and 11 illustrate measured results of the transmittance for each of the manufactured optical devices S3a and S3b. FIG. 10 is a diagram for explaining the transmittance property of the optical devices that are manufactured, and FIG. 11 is a diagram illustrating a part of FIG. 10 on an enlarged scale. More particularly, FIG. 10 illustrates the wavelength region of 300 nm to 450 nm illustrated in FIG. 9 on an enlarged scale. As illustrated in FIGS. 10 and 11, when the composition ratio of TINUVIN400 that is the ultraviolet light absorbing material added to the visible light transmitting part 30 is 0.5 wt % or higher, it may be seen that the transmittance of the ultraviolet light having the wavelength in the range of 300 nm to 360 nm can be maintained to be 10% or lower.

Figure 12:
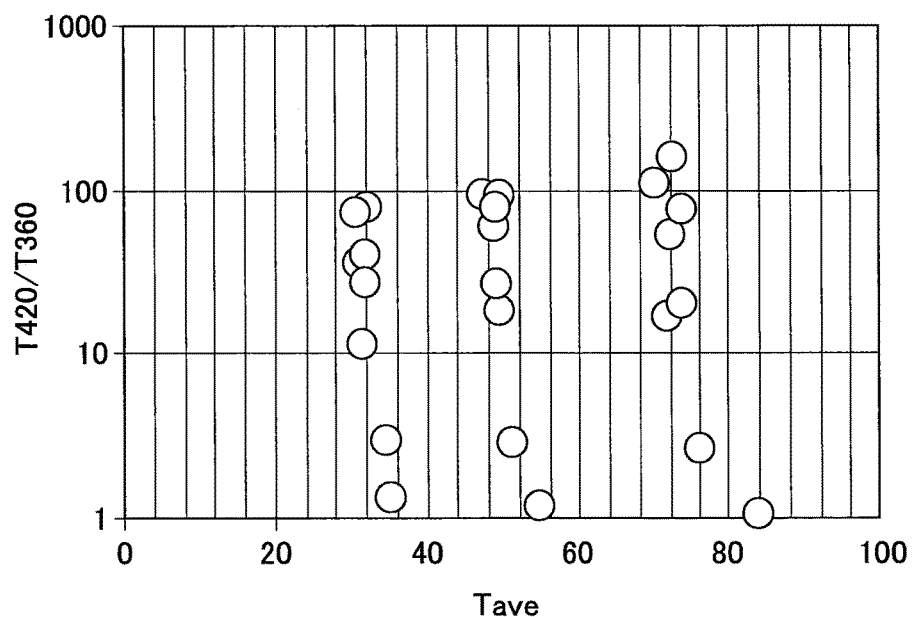
FIG. 12 is a correlation diagram of an average transmittance Tave and a ratio T420/T360 of the optical devices that are manufactured.

Table 1 illustrates values of the light transmittance T360 for the wavelength of 360 nm, the light transmittance T420 for the wavelength of 420 nm, and the ratio T420/T360 of the light transmittance T420 nm for the wavelength of 420 nm with respect to the light transmittance T360 for the wavelength of 360 nm, with respect to the optical devices S1, S2, S2a, S2b, S3, S3a, S3b, and S4. In addition, FIG. 12 is a correlation diagram of an average transmittance Tave of light having a wavelength in a range of 400 nm to 700 nm, and the value of the ratio T420/T360 of the optical devices that are manufactured.

S2, S2a, S3, S3a, S3b, and S4 having the visible light transmitting part that is added with a sufficient amount of the ultraviolet light absorbing material.

Next, a description will be given of results of an irradiation test that irradiates the light including the ultraviolet light. More particularly, the irradiation test is performed according to an environmental testing procedure A IEC60068-5-2-5. Table 1 illustrates a variation ΔT %(420 nm) in the transmittance at the wavelength of 420 nm before and after the irradiation of light. After the irradiation test, the variation ΔT %(420 nm) in the transmittances of the optical devices S1 and S2b decreases by 1% or more due to the irradiation of the ultraviolet light. On the other hand, after the irradiation test, the variation ΔT %(420 nm) in the transmittances of the optical devices S2, S2a, S3, S3a, S3b, and S4 decreases by less than 1%, and no problems are introduced from the practical point of view by utilizing theses optical devices S2, S2a, S3, S3a, S3b, and S4.

According to the embodiments and exemplary implementations of the present invention, it is possible to suppress deterioration caused by the ultraviolet light to the optical device in which the visible light transmittance decreases from the central part thereof towards the peripheral part thereof. In addition, it is possible to suppress deterioration caused by the ultraviolet light to other components of the optical system.

Further, the present invention is not limited to these embodiments and exemplary implementations, but various variations, modifications, or substitutions may be made without departing from the scope of the present invention.

What is claimed is:
1. An optical device comprising:
a visible light absorbing part that absorbs at least a part of visible light, that has a concave portion, and that has a

TABLE 1

| Optical Device | S1 | | | S2 | | | S2a | | | S2b | | |
|---|---|---|---|---|---|---|---|---|---|---|---|---|
| Ultraviolet Light Absorbing Material | None | | | TINUVIN400 | | | TINUVIN400 | | | TINUVIN400 | | |
| Loads | 0 | | | 5 wt % | | | 2 wt % | | | 0.5 wt % | | |
| Measuring Position | Pa | Pb | Pc | Pa | Pb | Pc | Pa | Pb | Pc | Pa | Pb | Pc |
| Tave 400-700 | 88.2 | 59.2 | 39.2 | 87.3 | 58.3 | 37.8 | 86.5 | 58.0 | 38.2 | 86.2 | 58.7 | 40.1 |
| T420 | 86.4 | 54.9 | 34.0 | 82.5 | 52.4 | 32.2 | 84.8 | 53.9 | 33.2 | 85.0 | 55.4 | 36.0 |
| T360 | 81.9 | 45.7 | 25.4 | 1.1 | 0.7 | 0.8 | 4.1 | 2.0 | 1.2 | 32.1 | 18.9 | 11.9 |
| T420/T360 | 1.1 | 1.2 | 1.3 | 77.7 | 79.7 | 39.8 | 20.5 | 27.2 | 27.4 | 2.6 | 2.9 | 3.0 |
| ΔT % (420 nm) | 3.0 | | | 0.2 | | | 0.4 | | | 1.4 | | |

| Optical Device | S3 | | | S3a | | | S3b | | | S4 | | |
|---|---|---|---|---|---|---|---|---|---|---|---|---|
| Ultraviolet Light Absorbing Material | TINUVIN460 | | | TINUVIN460 | | | TINUVIN460 | | | TINUVIN384-2 | | |
| Loads | 5 wt % | | | 2 wt % | | | 0.5 wt % | | | 5 wt % | | |
| Measuring Position | Pa | Pb | Pc | Pa | Pb | Pc | Pa | Pb | Pc | Pa | Pb | Pc |
| Tave 400-700 | 86.1 | 61.1 | 37.5 | 87.1 | 58.7 | 37.6 | 84.4 | 58.7 | 37.4 | 89.0 | 58.0 | 39.2 |
| T420 | 81.7 | 55.4 | 31.1 | 86.2 | 54.3 | 32.5 | 81.6 | 53.5 | 31.8 | 87.9 | 53.5 | 34.1 |
| T360 | 0.7 | 0.6 | 0.4 | 1.6 | 0.9 | 0.9 | 4.8 | 2.9 | 2.7 | 0.5 | 0.6 | 0.4 |
| T420/T360 | 111.6 | 92.3 | 72.1 | 53.9 | 60.6 | 36.0 | 17.0 | 18.6 | 11.6 | 161.0 | 95.0 | 79.6 |
| ΔT % (420 nm) | 0.0 | | | 0.3 | | | 0.3 | | | 0.0 | | |

As illustrated in Table 1, the value of the ratio T420/T360 is 1.1 to 1.3 in the case of the optical device S1 having the visible light transmitting part that is not added with the ultraviolet light absorbing material. In addition, the value of the ratio T420/T360 is 2.6 to 3.0 in the case of the optical device S2b having the visible light transmitting part that is not added with a sufficient amount of the ultraviolet light absorbing material. On the other hand, the value of the ratio T420/T360 is 10 or higher in the case of the optical devices thickness that increases from a central part thereof towards a peripheral part thereof; and a visible light transmitting part embedded in the concave portion of the visible light absorbing part, comprising an ultraviolet light absorbing material, the visible light transmitting part transmitting the visible light and having a thickness that decreases from a central part thereof towards a peripheral part thereof, wherein the optical device has a visible light transmittance that decreases from a central part thereof towards a peripheral part thereof, and a relationship T420/T360>=3 is satisfied in a region in which Tave>=50%, where T420 denotes a transmittance of light having a wavelength of 420 nm, T360 denotes a transmittance of light having a wavelength of 360 nm, and Tave denotes an average transmittance of light having a wavelength in a range of 400 nm to 700 nm.

2. The optical device as claimed in claim 1, wherein T360<=10%.

3. The optical device as claimed in claim 1, wherein the visible light transmitting part comprises an ultraviolet light absorbing resin that transmits the visible light and absorbs ultraviolet light.

4. The optical device as claimed in claim 1, wherein
the visible light absorbing part and the visible light transmitting part are formed on a base material that transmits ultraviolet light, and
the visible light transmitting part comprises a radiation curing resin.

5. The optical device as claimed in claim 1, wherein the visible light transmitting part comprises an ultraviolet curing resin.

6. An optical system comprising:
an optical device as claimed in claim 1; and
a lens.

7. An imaging apparatus comprising:
an optical system as claimed in claim 6; and
an imaging device,
wherein the lens is made of a resin material and is positioned between the optical device and the imaging device.

8. An optical device comprising:
a visible light absorbing part that absorbs at least a part of visible light, that has a concave portion, and that has a thickness that increases from a central part thereof towards a peripheral part thereof; and
a visible light transmitting part embedded in the concave portion of the visible light absorbing part, comprising an ultraviolet light absorbing material, the visible light transmitting part transmitting the visible light and having a thickness that decreases from a central part thereof towards a peripheral part thereof,
wherein the optical device has a visible light transmittance that decreases from a central part thereof towards a peripheral part thereof, and
a relationship T420/T360>=3 is satisfied in a region in which a visible light transmittance is highest, where T420 denotes a transmittance of light having a wavelength of 420 nm, and T360 denotes a transmittance of light having a wavelength of 360 nm.

9. The optical device as claimed in claim 8, wherein T360<=10%.

10. The optical device as claimed in claim 8, wherein the visible light transmitting part comprises an ultraviolet light absorbing resin that transmits the visible light and absorbs ultraviolet light.

11. The optical device as claimed in claim 8, wherein
the visible light absorbing part and the visible light transmitting part are formed on a base material that transmits ultraviolet light, and
the visible light transmitting part comprises a radiation curing resin.

12. The optical device as claimed in claim 8, wherein the visible light transmitting part comprises an ultraviolet curing resin.

13. An optical system comprising:
an optical device as claimed in claim 8; and
a lens.

14. An imaging apparatus comprising:
an optical system as claimed in claim 13; and
an imaging device,
wherein the lens is made of a resin material and is positioned between the optical device and the imaging device.

15. An optical device comprising:
a visible light absorbing part that absorbs at least a part of visible light, that has a concave portion, and that has a thickness that increases from a central part thereof towards a peripheral part thereof; and
a visible light transmitting part embedded in the concave portion of the visible light absorbing part, comprising an ultraviolet light absorbing material, the visible light transmitting part transmitting the visible light and having a thickness that decreases from a central part thereof towards a peripheral part thereof,
wherein the optical device has a light transmittance that decreases from a central part thereof towards a peripheral part thereof, and
a transmittance of light having a wavelength in a range of 300 nm to 360 nm is 10% or lower.

16. The optical device as claimed in claim 15, wherein the visible light transmitting part comprises the ultraviolet light absorbing material and a transparent resin material that transmits the visible light.

17. The optical device as claimed in claim 15, wherein the visible light transmitting part comprises an ultraviolet light absorbing resin that transmits the visible light and absorbs ultraviolet light.

18. An optical system comprising:
an optical device as claimed in claim 15; and
a lens.

19. The optical device as claimed in claim 1, wherein a relationship T420/T360>=10 is satisfied in the region in which Tave>=50%.

20. The optical device as claimed in claim 8, wherein a relationship T420/T360>=10 is satisfied in which a visible light transmittance is highest.

* * * * *